INVENTORS:
ERNST PETSCH
FRIEDRICH HAUSCHILD

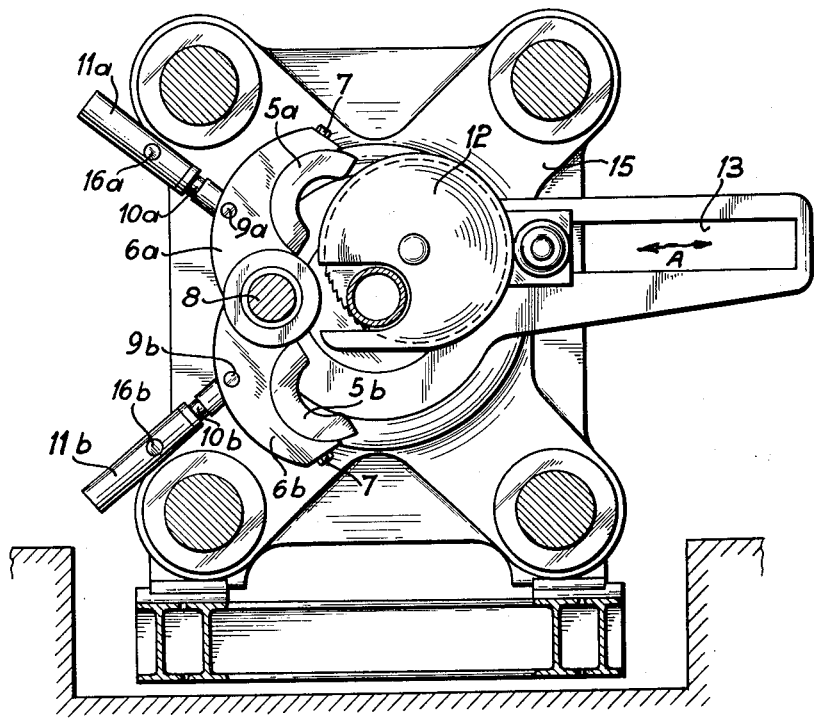

United States Patent Office 3,028,006
Patented Apr. 3, 1962

3,028,006
METHOD AND MEANS FOR SEVERING THE BUTT-END OF EXTRUDED MATERIAL IN METAL STOCK AND TUBE EXTRUSION PRESS
Ernst Petsch and Friedrich Hauschild, Duisburg, Germany, assignors to Hydraulik G.m.b.H., Duisburg, Germany
Filed Apr. 10, 1959, Ser. No. 805,413
Claims priority, application Germany Apr. 14, 1958
3 Claims. (Cl. 207—1)

The present invention relates to a process and means for severing the stock or butt end of a piece of extruded profiled material resulting from the operation of an extrusion press.

The present invention is directed to the arrangement of severing means relative to a die which remains axially fixed during the extrusion process, as well as during the severing process of the butt end of the extruded stock resulting from the extrusion process. Hence the extruded resultant stock also remains axially fixed and under pressure in the head block of the press until it is severed.

In extrusion and in particular in tube extruding presses known in the art the displacement of the die support together with the die held therein and of the butt end adhering thereto, as well as of the press plate takes place in axial direction by means of the pressure cross-head.

The severing of the butt end or burr in this type of a press presents no problem, because the severing means employed can be easily accommodated within the free space created by the above described axial displacement.

In more recent types of extrusion presses the dies are supported by cross slides or revolving plates arranged in the press.

This type of extrusion press has in addition to the aforementioned plates an axially movable receiving member which after the extrusion performance can be withdrawn to such an extent that there is sufficient free space created forwardly of the extrusion die so as to permit operation of scissors, sawing or similar severing means to cut off the butt end or stock remnant from the extruded profiled stock material.

In severing this butt end by this process, however, an undesirable burr or ridge remains on the severed extruded strip, bar or tube depending upon the shape being extruded.

This burr or ridge offers great difficulties to the withdrawal of the extruded material stock from the die. The die may be easily damaged during such action or the extruded strip or tube material may be deformed during withdrawal thereof.

In order to avoid the above described and other disadvantages the extrusion press according to the invention is provided with means for axially withdrawing the die and receiver member so that space is provided between the die and the counter beam of the press, wherein means can be inserted for severing the extruded stock. In this type of extrusion press the severing of the stock occurs behind the die, so that the severed stock can be withdrawn without difficulty.

In view of the above, it is a general object of the present invention to provide means contributing to simplified and highly economical process and means for severing the butt end from extruded profiled material derived from the extrusion press.

It is another object of the present invention to provide means greatly reducing the cost and time for the performance of the above extrusion and severing process.

It is a more specific object of the present invention to provide means ensuring severance of extruded stock between the die and the counter spar or cross beam without the necessity of axially displacing the extrusion die and the appurtenant counter beam and die holder or receiver.

It is still another object of the present invention to provide means affording the replacement of the cumbersome arrangement in which the die and heavy receiver are movably supported by cross slide or revolving plates, as only a few movable parts are now required to fulfill the contemplated result.

These and other objects of the invention are achieved by providing the extrusion press with a movably mounted pressure plate ring assembly, which serves as a support for the die during the extrusion of the material and which is removably mounted between said die and counter beam. After the extrusion process is terminated and before the severing process occurs, the pressure plate ring assembly is removed or withdrawn without damaging the extruded material, butt end or severing means, such as a rotary saw or the like, being then effective in the thus created freely accessible space for severing the stock rest of the extruded material. This severing process leaves the severed stock without any burrs or ridges whatsoever.

After the severing of the stock has been completed, the aforesaid severing means will be again withdrawn from within the range of the longitudinal axis of the press and the pressure plate ring assembly which serves as a support for the die is hydraulically, electrically or otherwise guided to operative position so that the extrusion press is again ready for the next extrusion operation.

In order to facilitate the above described procedure the pressure plate ring preferably comprises two adjustable parts or sections which are pivotally connected to each other. Means are provided for moving each of these two adjustable sections away from their inoperative position immediately adjacent to the die so that the extruded stock becomes sufficiently exposed for the application of the aforesaid severing means. The sections forming the pressure plate ring assembly, are returned to said operative position after the butt end or stock rest has been severed from the extruded profiled material proper. The extrusion press is then ready for the next operational cycle.

In a preferred embodiment of the invention the two-part pressure plate ring assembly is mounted on a common shaft which is spaced from and eccentrically disposed with respect to the effective longitudinal axis of the extrusion press.

Due to scissor-like arrangement the two parts or sections of the plate can be guided, on the one hand toward the longitudinal axis of the press in registry and abutting contact with each other, so that both said parts may act as one solid pressure plate, or on the other hand, both parts may be completely swung away from said longitudinal axis of the press along which the extrusion proceeds, so that they do not hinder any subsequent application of the shearing or severing means.

It is therefore another important object of the present invention to provide means redouding to a very efficacious mechanism, which can be easily operated and built into heretofore existing extrusion presses, thereby greatly facilitating the removal therefrom of profiled extruded material in perfect condition and free from any burrs or flashes.

Yet a still further object of the invention resides in the provision of means ensuring positive control of the above-mentioned mechanism in timed relation to the press performance, so that upon completion of the extrusion phase severing means may become effective for cutting off the extruded workpiece or profiled material from its stock rest without causing any burr or like formation on said material, thereby attaining resultant material of high quality and avoiding any after-treatment therefor.

Further novel features and objects which are considered as characteristic of the invention are set forth in the appended claims. The invention itself, however, both as to means and process of operation, together with additional objects and advantages thereof, will be best understood from the description of specific embodiments when read in connection with the accompanying drawings, in which:

FIG. 3 is a cross-sectional view as illustrated in FIG. 2, but showing the severing mechanism in an operative position.

Figure 1:
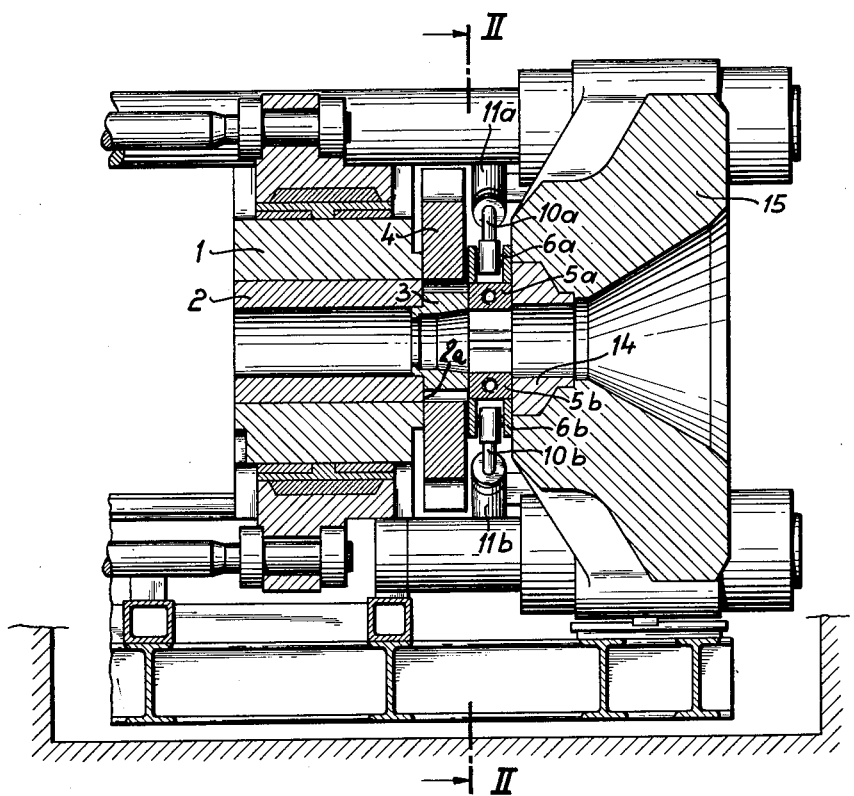
FIG. 1 is a longitudinal sectional view of the head portion of an extrusion press embodying the invention.

Referring now more particularly to FIG. 1 there is disclosed a part of an extrusion press having a receiver portion 1 which supports an inner sleeve 2 terminating in a frontal end surface 2a which abuts against the die 3. A die slide is indicated at 4. The latter is retained in turn against the two-part pressure plate ring sections 5a and 5b which are sandwiched between the die 3 and the fixed ring or cross beam 14 supported by the counter spar or end element 15. Elements 14 and 15 thus constitute a customary platen construction. The press framework comprises the usual tie rods and base, the latter resting on a conventional foundation as illustrated in FIG. 1, although no particular reference numerals have been applied to these parts.

Figure 2:
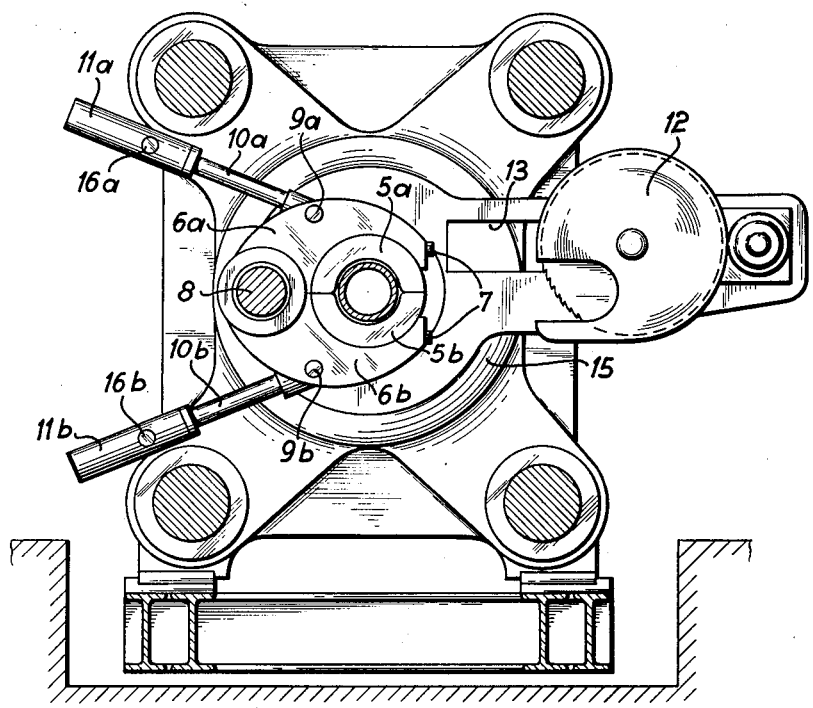
FIG. 2 is a cross-sectional view of the head portion taken along lines II—II of FIG. 1 and indicating the severing mechanism in inoperative position.

In FIG. 2 the two-part pressure plate ring sections 5a and 5b are shown in normal operating position. Both these sections when in operating position form a closed ring which serves as a pressure support plate for the press die 3. The two sections or parts 5a and 5b are secured to the scissor-like moving means or segments 6a and 6b by means of two screws 7. The moving means 6a and 6b are swingably mounted on a pivot shaft 8. The moving means 6a and 6b are fixedly connected, respectively, to piston rods 10a and 10b by means of pins 9a and 9b. The piston rods 10a and 10b are slidably arranged in the hydraulic actuating cylinders 11a and 11b, which are, respectively, mounted on the body of the press by means of the pin supports 16a and 16b.

The mechanism forming part of the present invention operates as follows:

After the completion of an extrusion process, in which the billet in the extrusion press has almost been completely worked upon, hydraulic pressure is applied to the cylinders 11a and 11b (by a suitable source, not shown) actuating thereby the scissor-like moving means 6a and 6b via pistons 10a, 10b, the two sections of the pressure plate ring 5a and 5b are thereby swung about the shaft 8 away from the immediate vicinity of the die 3 (see FIG. 3). The surface of the press piece is thereby partly exposed so that the severing means 12 including a saw can be slidably moved along the guide rail 13 (according to arrow A) toward the center of the press to cut off the extrued stock located therein.

The above described inventive apparatus affords many substantial advantages. For instance, the cumbersome arrangement of known severing mechanisms which usually comprise a die, head and heavy receiver mounted on cross slide or revolving plates are replaced by a simple and light structure having only a few movable parts. Whereas the known mechanisms are time consuming in operation and require a substntaial and costly support structure, the withdrawal of the aforesaid plate ring sections according to the present invention may be rapidly accomplished and the mechanism for actuating said sections requires only a very simple retractable support structure.

It is well understood that the severing mechanism 12, 13 may be power driven in any suitable manner and that the movements of said mechanism and of the pressure ring assembly may be positively controlled and may occur in timed relation, so that, when said pressure ring assembly is withdrawn from its operative to its inoperative position the severing means come automatically into action, if desired.

It can thus be seen that there has been provided an extrusion press for severing the butt end of an extruded stock material comprising a die having an opening, a movable pressure plate ring assembly normally abutting against the frontal face of said die and having an opening axially aligned with that of the latter, and operable means connected to said pressure plate ring assembly for pivotally displacing said pressure plate ring assembly toward and away from the longitudinal axis passing through said openings, said severing means being arranged for transverse movement to said axis in said press for cutting the extruded stock at a location normally occupied by said pressure plate ring assembly after displacement of the latter by said operable means.

Various changes and modifications may be made without departing from the spirit and scope of the present invention and it is intended that such obvious changes and modifications be embraced by the annexed clams.

Having thus described the invention, what is claimed as new and desired to be secured by Letters Patent is:

1. In an extrusion press having a longitudinal axis of operation; means for severing extruded material from its butt end a die located in said press and defining a first opening through which said material is passed, said first opening being aligned with said longitudinal axis, a cross beam coaxial with said die and axially spaced therefrom, said cross beam defining a second opening in alignment with said first opening, a pressure plate ring assembly including a pair of pressure plate ring sections arranged between said die and said cross beam and jointly defining a third opening in axial alignment with that of said die and that of said cross beam, said pressure plate ring sections being pivoted at locations external to said longitudinal axis, pivot means spaced from said longitudinal axis and operatively connected to said pressure plate ring sections, and means operatively connected to said pressure plate ring sections for swingably moving said pressure plate ring sections about said pivot means toward and away from said longitudinal axis and each other, said means for severing including a saw movably mounted on said press for cutting off the extruded material at the location occupied by said pressure plate ring sections after displacement of the latter by said operatively connected means.

2. An extrusion press according to claim 1, said operatively connected means including two hydraulic cylinders each mounted on and pivotable about a respective pin support stationarily attached to said cross beam, and respective piston rods movable from and within said cylinders by fluid directed thereto, the outer end of each of said piston rods being connected to a respective one of said sections so as to cause and control the pivoting movement thereof.

3. An extrusion press comprising a platen having an axial product clearance passage therethrough and being stationarily mounted on a press framework with the platen axis extending horizontally, a billet container having an axial billet cavity therethrough and being assembled in spaced relation to said platen and coaxial with said platen axis, a die having an axial extrusion orifice and being assembled coaxial with and abutting against said billet container on the platen side thereof, two pivotally connected scissor-like segments with the pivot portion therefor rotatably assembled about and concentrically enclosing an axis parallel to and spaced from said platen axis, two pressure plate ring sections individually assembled each to a respective one of said scissor-like segments so that, when the latter are pivoted to close, said ring sections abut one against the other and conjointly form an axial opening therethrough larger than said extrusion orifice, said opening, when said ring sections abut, being coaxial with said platen axis in which condition said ring sections abuttingly engage a face on said die and a face on said platen, two hydraulic piston and cylinder units each pivotally connected to said platen with each individual piston of the respective said units being pivotally connected to a corresponding one of said ring sections so that the same may be moved thereby; saw means for severing the extruded product, said saw means being movable in and across the positions occupied by said ring sections in their abutting condition; whereby, with said ring sections abutting, pressure is applied to a billet in said billet cavity causing a product to extrude through said orifice coaxial with said platen axis, said pressure is relieved stopping the extruding, said segments with their attached said ring sections are pivoted each away from said platen axis affording clearance therearound so that said saw means is then moved in to sever said product across the positions previously occupied by said ring sections.

References Cited in the file of this patent

UNITED STATES PATENTS

| | | |
|---|---|---|
| 1,849,044 | Summey | Mar. 8, 1932 |
| 2,720,970 | Roux | Oct. 18, 1955 |
| 2,753,043 | Poleschuk | July 3, 1956 |
| 2,858,017 | Kent et al. | Oct. 28, 1958 |
| 2,896,782 | Billen | July 28, 1959 |

FOREIGN PATENTS

| | | |
|---|---|---|
| 1,146,985 | France | May 27, 1957 |